(12) United States Patent
Branch

(10) Patent No.: US 10,421,384 B2
(45) Date of Patent: Sep. 24, 2019

(54) LOAD SECURING SYSTEM

(71) Applicant: Loyie Branch, Sevierville, TN (US)

(72) Inventor: Loyie Branch, Sevierville, TN (US)

( * ) Notice: Subject to any disclaimer, the term of this patent is extended or adjusted under 35 U.S.C. 154(b) by 182 days.

(21) Appl. No.: 15/708,629

(22) Filed: Sep. 19, 2017

(65) Prior Publication Data

US 2019/0084467 A1    Mar. 21, 2019

(51) Int. Cl.
| | |
|---|---|
| *B60P 7/08* | (2006.01) |
| *B60P 3/035* | (2006.01) |
| *B60P 3/00* | (2006.01) |
| *B60P 7/12* | (2006.01) |
| *B61D 3/16* | (2006.01) |
| *B61D 45/00* | (2006.01) |
| *B63B 25/28* | (2006.01) |

(52) U.S. Cl.
CPC ............. *B60P 3/035* (2013.01); *B60P 3/00* (2013.01); *B60P 7/0807* (2013.01); *B60P 7/0869* (2013.01); *B60P 7/12* (2013.01); *B61D 3/16* (2013.01); *B61D 45/00* (2013.01); *B61D 45/001* (2013.01); *B61D 45/003* (2013.01); *B63B 25/28* (2013.01)

(58) Field of Classification Search
CPC ........... B60P 3/035; B60P 7/12; B60P 7/0807; B60P 3/00; B60P 7/0869; B63B 25/28; B61D 45/00; B61D 45/001; B61D 45/003; B61D 3/16

USPC .... 410/42, 47–50, 41, 99, 120, 155; 24/299, 24/116 R, 131 C; 206/397, 415–416, 453, 206/586; 242/594.2
See application file for complete search history.

(56) References Cited

U.S. PATENT DOCUMENTS

| | | |
|---|---|---|
| 2,772,064 A | 11/1956 | Cole |
| 4,526,500 A | 7/1985 | Patrick |
| 5,538,376 A | 7/1996 | Borda |
| 6,250,860 B1 * | 6/2001 | Hornady ............... B60P 7/0807 410/100 |
| D514,924 S | 2/2006 | Bergnach |
| 7,431,547 B2 | 10/2008 | Geary et al. |
| 8,888,064 B2 | 11/2014 | Skorupa |
| 2003/0198527 A1 | 10/2003 | Galas |
| 2012/0128441 A1 * | 5/2012 | McDaniel ............. B60P 7/0869 410/47 |

FOREIGN PATENT DOCUMENTS

WO    WO2006125107    11/2006

* cited by examiner

*Primary Examiner* — Stephen T Gordon

(57) ABSTRACT

A load securing system for transporting a coil includes a coil that may be transported on a trailer. The coil has top side, an outwardly facing side and a central aperture. The central aperture has a bounding surface. A plurality of securing units is provided and hingedly coupled together such that the plurality of securing units forms a circle. Each of the securing units is selectively positioned on the coil when the coil is transported to protect the coil from impact damage. A chain plurality of chains is each extended over an associated one of the securing units to secure the coil to the trailer. Each of the securing units is comprised of a rigid material to inhibit the chains from damaging the coil.

14 Claims, 5 Drawing Sheets

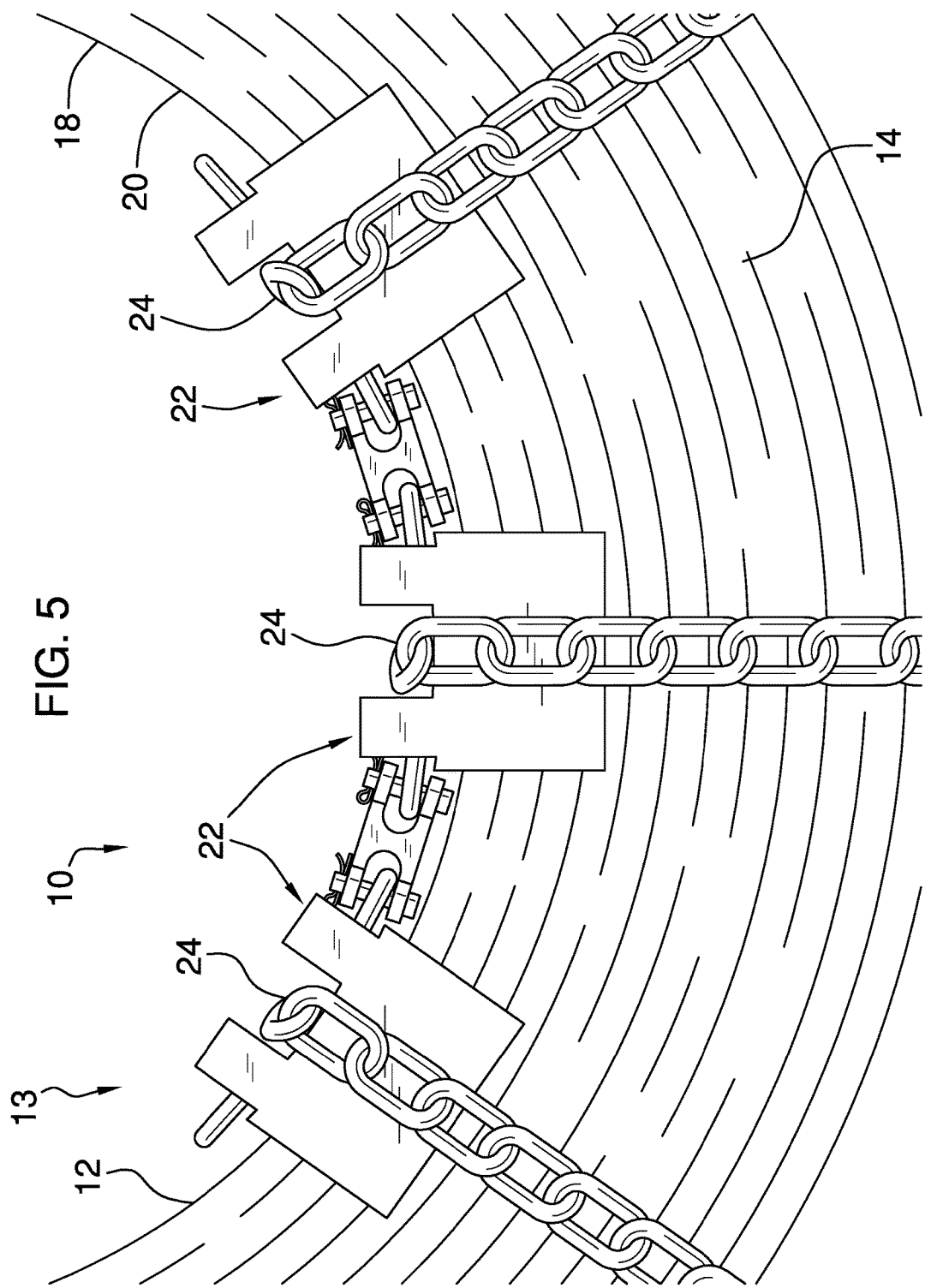

LOAD SECURING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art including information disclosed under 37 CFR 1.97 and 1.98

The disclosure and prior art relates to securing devices and more particularly pertains to a new securing device for transporting a coil.

BRIEF SUMMARY OF THE INVENTION

An embodiment of the disclosure meets the needs presented above by generally comprising a coil that may be transported on a trailer. The coil has top side, an outwardly facing side and a central aperture. The central aperture has a bounding surface. A plurality of securing units is provided and hingedly coupled together such that the plurality of securing units forms a circle. Each of the securing units is selectively positioned on the coil when the coil is transported to protect the coil from impact damage. A chain plurality of chains is each extended over an associated one of the securing units to secure the coil to the trailer. Each of the securing units is comprised of a rigid material to inhibit the chains from damaging the coil.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is a top perspective view of an embodiment of the disclosure.

DETAILED DESCRIPTION OF THE INVENTION

Figure 1:
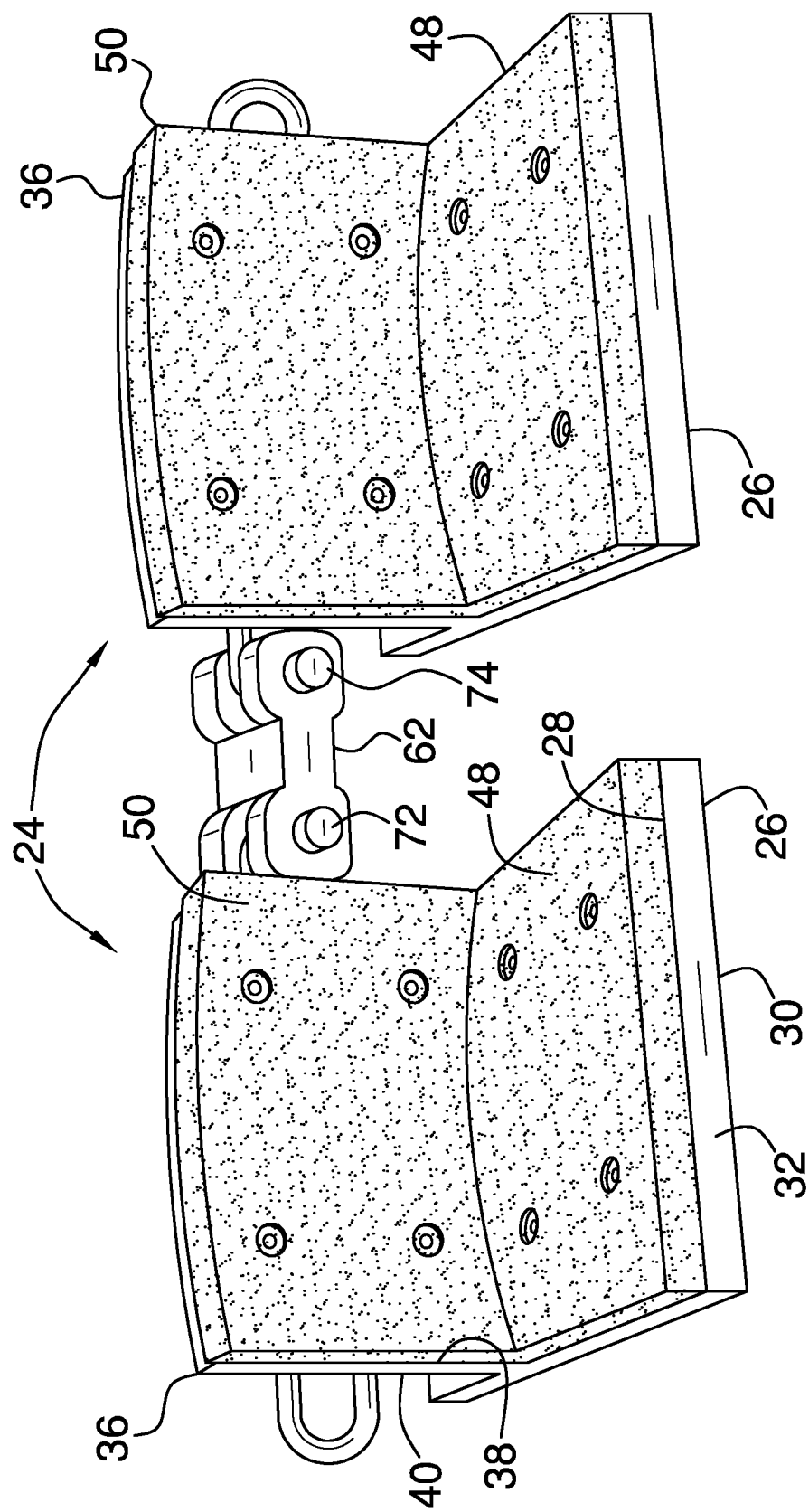
FIG. 1 is a back perspective view of a plurality of securing units of a load securing system according to an embodiment of the disclosure.
Figure 2:
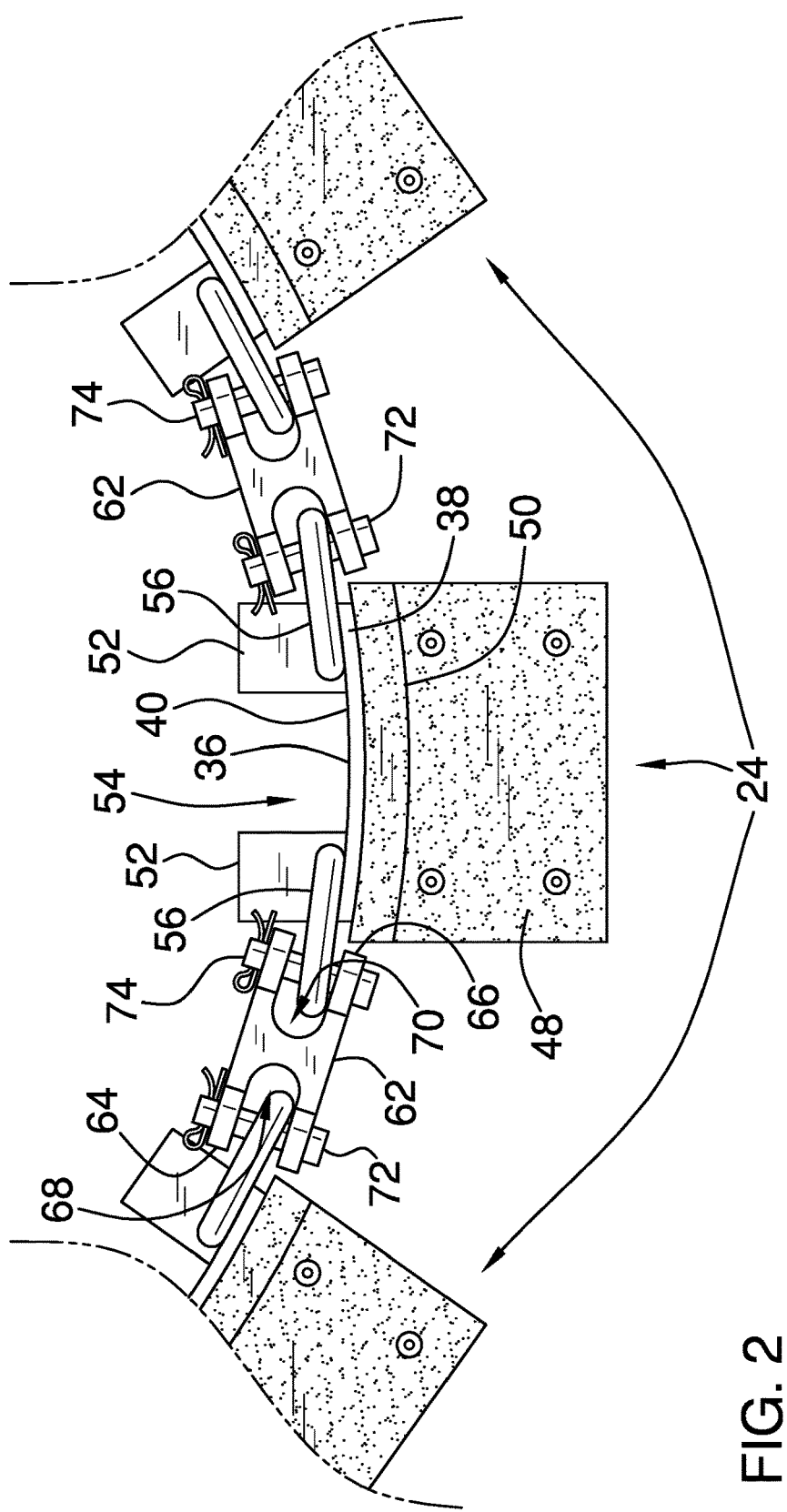
FIG. 2 is a bottom perspective view of a plurality of securing units of an embodiment of the disclosure.
Figure 3:
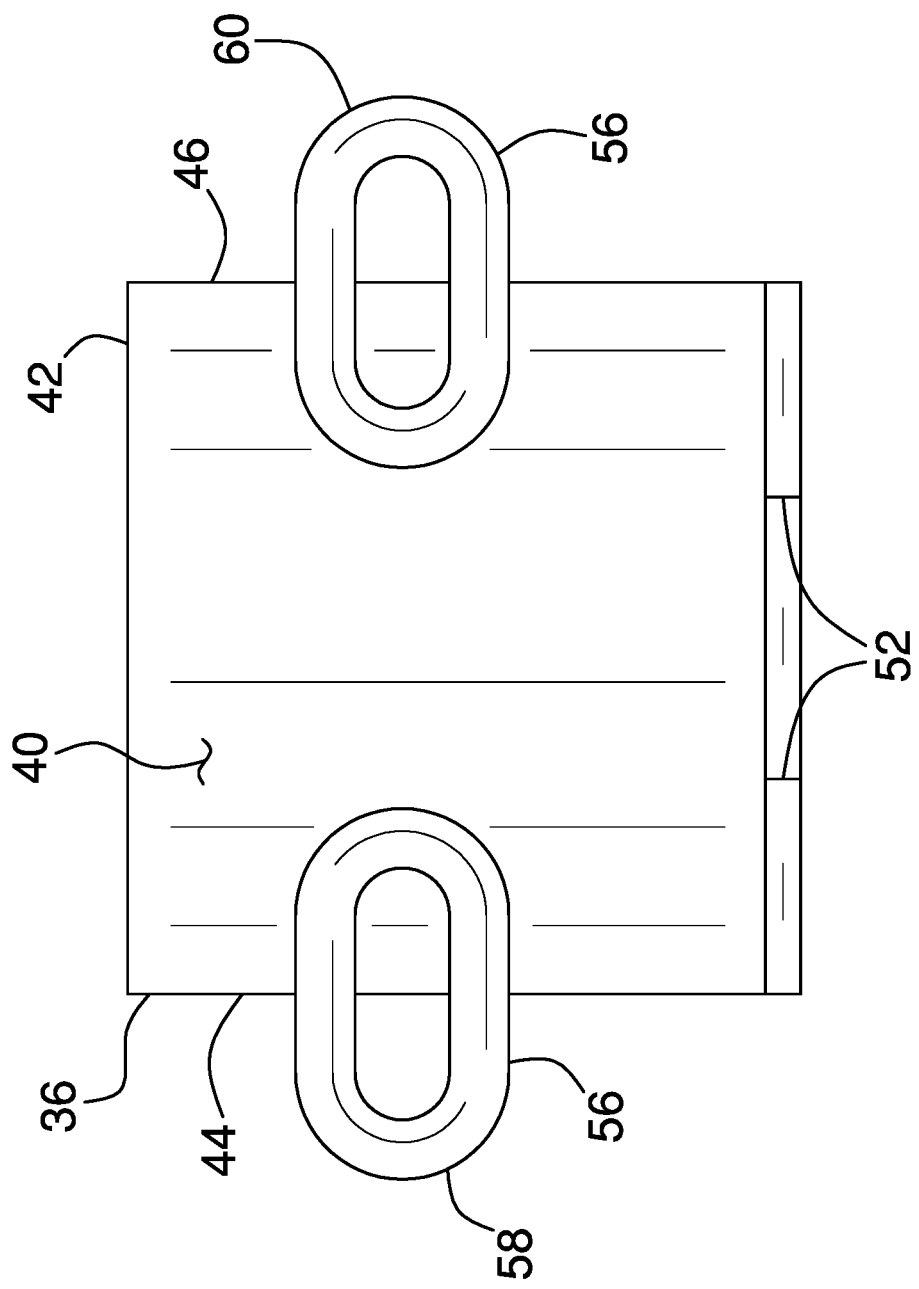
FIG. 3 is a front view of a securing unit of an embodiment of the disclosure.
Figure 4:
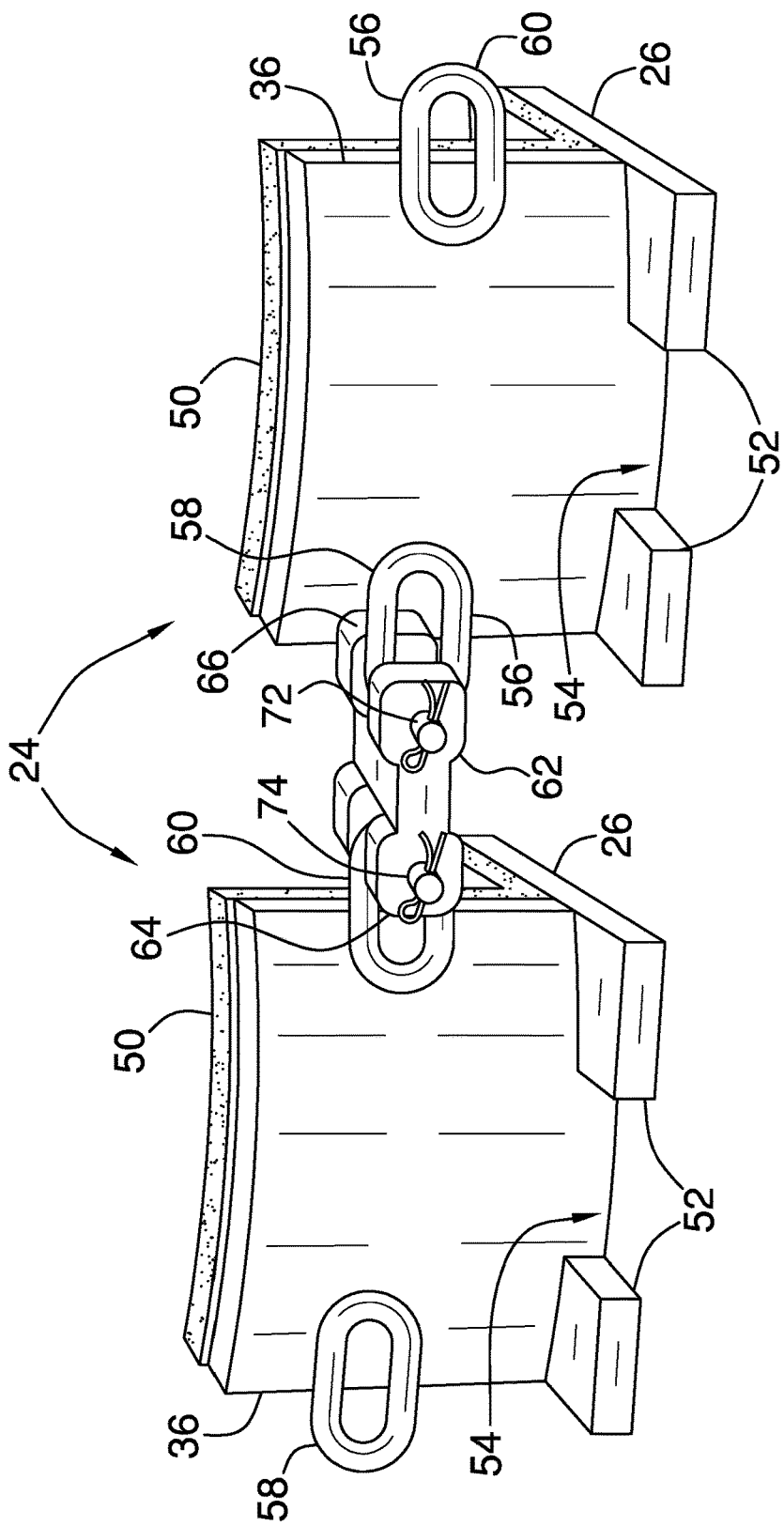
FIG. 4 is a front perspective view of a plurality of securing units of an embodiment of the disclosure.

With reference now to the drawings, and in particular to FIGS. 1 through 5 thereof, a new securing device embodying the principles and concepts of an embodiment of the disclosure and generally designated by the reference numeral 10 will be described.

As best illustrated in FIGS. 1 through 5, the load securing system 10 generally comprises a coil 12 that may be transported on a trailer 13. The coil 12 has a top side 14, and a central aperture 18. The central aperture 18 has a bounding surface 20. The coil 12 may be a rolled strip of steel, a heat exchanger and any other coil 12 that is constructed of a deformable material. The trailer 13 may be a flatbed semi trailer and any other cargo trailer.

A plurality of securing units 22 is provided and each of the securing units 22 is hingedly coupled together such that the plurality of securing units 22 may be manipulated to form circle. Each of the securing units 22 is selectively positioned on the coil 12 when the coil 12 is transported. Moreover, each of the securing units 22 extends downwardly along the bounding surface 20. In this way the plurality of securing units 22 protects the bounding surface 20 from impact damage. Each of the securing units 22 extends outwardly along the top side 14 to protect the top side 14 from impact damage.

A plurality of chains 24 is each extended over an associated one of the securing units 22 thereby facilitating the chains 24 to secure the coil 12 to the trailer 13. Each of the securing units 22 is comprised of a rigid material to inhibit the chains 24 from damaging the coil 12. The chain 24 on each of the securing units 22 is employed in lieu of a strap. Coils being transported on a trailer 13 are conventionally secured to the trailer 13 using straps since the straps do not pose the risk of impact damage to the coils. The straps have been known the break causing the coils to fall off of the trailer 13 and endanger motorists on a roadway. The plurality of securing units 22 facilitates the coil 12 to be secured with chains 24 thereby reducing the possibility of the coil 12 breaking free from the trailer 13.

Each of the securing units 22 comprises a first panel 26. The first panel 26 has a first surface 28, a second surface 30 and a peripheral edge 32 extending therebetween. The peripheral edge 32 has a back side 34 and the first panel 26 lies on the top side 14 of the coil 12. Each of the securing units 22 comprises a second panel 36 extending away from the first panel 26 such that the second panel 36 forms an angle with respect to the first panel 26. The second panel 36 may be oriented perpendicular to the first panel 26 to form a right angle. The second panel 36 has a primary surface 38, a secondary surface 40 and a perimeter edge 42 extending therebetween. The perimeter edge 42 has a first lateral side 44 and a second lateral side 46.

The second panel 36 is aligned with and is coextensive with the back side 34 of the first panel 26. Additionally, the second panel 36 extends downwardly along the bounding surface 20 of the coil 12. Each of the primary surface 38 and the secondary surface 40 is concavely arcuate between the first 44 and second 46 lateral sides. Thus, the second panel 36 conforms to a curvature of the bounding surface 20.

A first pad 48 is coupled to the first surface 28 of the first panel 26 and the first pad 48 abuts the top side 14 of the coil 12 when the first panel 26 is positioned on the coil 12. The first pad 48 is comprised of a resiliently compressible material such as rubber or the like. The first pad 48 may be riveted to the first panel 26 and each of the rivets may be recessed into the first pad 48. Thus, the rivets are inhibited from frictionally engaging the coil 12.

A second pad 50 is coupled to the primary surface 38 of the second panel 36. Thus, the second pad 50 abuts the bounding surface 20 of the coil 12 when the second panel 36 is positioned on the coil 12. The second pad 50 is comprised of a resiliently compressible material such as rubber or the like. The second pad 50 may be riveted to the second panel 36 and each of the rivets corresponding to the second pad 50 may be recessed into the second pad 50. Thus, the rivets corresponding to the second pad 50 are inhibited from frictionally engaging the coil 12.

A pair of tabs 52 is provided and each of the tabs 52 extends away from the secondary surface 40 of the second panel 36. The tabs 52 are aligned with an intersection between the first panel 26 and the second panel 36. Moreover, the tabs 52 are spaced apart from each other to define a chain space 54 between the tabs 52. The chain space 54 receives the associated chain 24 and each of the tabs 52 inhibits the associated chain 24 from sliding off of the second panel 36.

A pair of loops 56 is provided and each of the loops 56 is coupled to the secondary surface 40 of the second panel 36. Each of the loops 56 extends outwardly beyond an associated one of the first lateral side 44 and the second lateral side 46 of the second panel 36. Additionally, each of the loops 56 is spaced from an associated one of the tabs 52. The pair of loops 56 includes a first loop 58 and a second loop 60.

A plurality of links 62 is provided and each of the links 62 is pivotally coupled between an associated pair of the securing units 22. Each of the links 62 has a first end 64 and a second end 66. The first end 64 has a first slot 68 extending toward the second end 66. The first slot 68 insertably receives the first loop 58 on an associated one of the securing units 22. The second end 66 has a second slot 70 extending toward the first end 64. The second slot 70 insertably receives the second loop 60 on an associated one of the securing units 22.

A plurality of first pins 72 is provided and each of the first pins 72 is selectively extended through an associated one of the links 62. Each of the first pins 72 extends through the first slot 68 in the associated link and the first loop 58 of the associated securing unit 22. In this way the associated securing unit 22 is pivotally coupled to the associated link 62.

A plurality of second pins 74 is provided and each of the second pins 74 is selectively extended through an associated one of the links 62. Each of the second pins 74 extends through the second slot 70 in the associated link 62 and the second loop 60 of the associated securing unit 22. In this way the associated securing unit 22 is pivotally coupled to the associated link 62. Each of the first 72 and second pins 74 may have a head that abuts the associated link 62. Additionally, a plurality of cotter pins may be provided and each of the cotter pins may be extended through an associated one of the first 72 and second pins 74. Thus, each of the first 72 and second pins 74 is inhibited from being removed from the associated link 62. Each of the securing units 22 may be uncoupled from each other and used individually on the coil 12.

In use, the coil 12 is positioned on the trailer 13 and the first panel 26 corresponding to each of the securing units 22 is placed on the top side 14 of the coil 12. The securing units 22 are manipulated to position the second panel 36 corresponding to each of said securing units 22 against the bounding surface 20 of the coil 12. A first end 64 of each of the chains 24 is coupled to the trailer 13 and each of the chains 24 is extended upwardly through the central aperture in the coil 12. Additionally, each of the chains 24 is extended across the first panel 26 of an associated one of the securing units 22. A second end 66 of each of the chains 24 is coupled to the trailer 13 and each of the chains 24 is tightened to secure the coil 12 to the trailer 13. The first pad 48 and the second pad 50 corresponding to each of the securing units 22 inhibits the coil 12 from being damaged during transportation by the chains 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A load securing system comprising:
  a coil being configured to be transported on a trailer, said coil having top side and a central aperture, said central aperture having a bounding surface; and
  a plurality of securing units, each of said securing units being hingedly coupled together, each of said securing units being selectively positioned on said coil when said coil is transported, each of said securing units extending downwardly along said bounding surface wherein said plurality of securing units is configured to protect said bounding surface from impact damage, each of said securing units extending outwardly along said top side wherein each of said securing units is configured to protect said top side from impact damage, each of said securing units being configured to have a chain extended thereover thereby facilitating securing of the chain to secure said coil to the trailer, each of said securing units being comprised of a rigid material wherein each of said securing units is configured to inhibit the chain from damaging said coil.

2. The assembly according to claim 1, wherein each of said securing units comprises a first panel having a first surface, a second surface and a peripheral edge extending therebetween, said peripheral edge having a back side, said first panel lying on said top side of said coil having said first panel extending outwardly from said bounding surface.

3. The assembly according to claim 2, further comprising a second panel extending away from said first panel such that said second panel forms an angle with respect to said first panel, said second panel having a primary surface, a secondary surface and a perimeter edge extending therebetween, said second panel perimeter edge having a first lateral side and a second lateral side, said second panel being aligned with and being coextensive with said back side of said first panel, said second panel extending downwardly along said bounding surface of said coil.

4. The assembly according to claim 3, wherein each of said primary surface and said secondary surface is concavely arcuate between said first and second lateral sides such that said second panel conforms to a curvature of said bounding surface.

5. The assembly according to claim 2, further comprising a first pad being coupled to said first surface of said first panel such that said first pad abuts said top side of said coil when said first panel is positioned on said coil, said first pad being comprised of a resiliently compressible material.

6. The assembly according to claim 3, further comprising a second pad being coupled to said primary surface of said second panel such that said second pad abuts said bounding surface of said coil when said second panel is positioned on said coil, said second pad being comprised of a resiliently compressible material.

7. The assembly according to claim 3, further comprising a pair of tabs, each of said tabs extending away from said secondary surface of said second panel, said tabs being aligned with an intersection between said first panel and said second panel, said tabs being spaced apart from each other to define a chain space between said tabs wherein said chain space is configured to receive the chain, each of said tabs being configured to inhibit the chain from sliding off of said second panel.

8. The assembly according to claim 7, further comprising a pair of loops, each of said loops being coupled to said secondary surface of said second panel, each of said loops extending outwardly beyond an associated one of said first lateral side and said second lateral side of said second panel, each of said loops being spaced from an associated one of said tabs, said pair of loops including a first loop and a second loop.

9. The assembly according to claim 8, further comprising a plurality of links, each of said links being pivotally coupled between an associated pair of said securing units, each of said links having a first end and a second end.

10. The assembly according to claim 9, wherein said first end has a first slot extending toward said second end, said first slot insertably receiving said first loop on an associated one of said securing units.

11. The assembly according to claim 9, wherein said second end has a second slot extending toward said first end, said second slot insertably receiving said second loop on an associated one of said securing units.

12. The assembly according to claim 11, further comprising a plurality of first pins, each of said first pins being selectively extended through an associated one of said links, each of said first pins extending through said first slot in said associated link and extending through said first loop of said associated securing unit such that said associated securing unit is pivotally coupled to said associated link.

13. The assembly according to claim 11, further comprising a plurality of second pins, each of said second pins being selectively extended through an associated one of said links, each of said second pins extending through said second slot in said associated link and extending through said second loop of said associated securing unit such that said associated securing unit is pivotally coupled to said associated link.

14. A load securing system comprising:
a coil being configured to be transported on a trailer, said coil having top side, an outwardly facing side and a central aperture, said central aperture having a bounding surface,
a plurality of securing units, each of said securing units being hingedly coupled together, each of said securing units being selectively positioned on said coil when said coil is transported, each of said securing units extending downwardly along said bounding surface wherein said plurality of securing units is configured to protect said bounding surface from impact damage, each of said securing units extending outwardly along said top side wherein each of said securing units is configured to protect said top side from impact damage, each of said securing units being configured to have a chain extended thereover thereby facilitating securing of the chain to secure said coil to the trailer, each of said securing units being comprised of a rigid material wherein each of said securing units is configured to inhibit the chain from damaging said coil, each of said securing units comprising:
a first panel having a first surface, a second surface and a peripheral edge extending therebetween, said peripheral edge having a back side, said first panel lying on said top side of said coil having said first panel extending outwardly from said bounding surface,
a second panel extending away from said first panel such that said second panel forms an angle with respect to said first panel, said second panel having a primary surface, a secondary surface and a perimeter edge extending therebetween, said second panel perimeter edge having a first lateral side and a second lateral side, said second panel being aligned with and being coextensive with said back side of said first panel, said second panel extending downwardly along said bounding surface of said coil, each of said primary surface and said secondary surface being concavely arcuate between said first and second lateral sides such that said second panel conforms to a curvature of said bounding surface,
a first pad being coupled to said first surface of said first panel such that said first pad abuts said top side of said coil when said first panel is positioned on said coil, said first pad being comprised of a resiliently compressible material,
a second pad being coupled to said primary surface of said second panel such that said second pad abuts said bounding surface of said coil when said second panel is positioned on said coil, said second pad being comprised of a resiliently compressible material, a pair of tabs, each of said tabs extending away from said secondary surface of said second panel, said tabs being aligned with an intersection between said first panel and said second panel, said tabs being spaced apart from each other to define a chain space between said tabs wherein said chain space is configured to receive the chain, each of said tabs being configured to inhibit the chain from sliding off of said second panel, and a pair of loops, each of said loops being coupled to said secondary surface of said second panel, each of said loops extending outwardly beyond an associated one of said first lateral side and said second lateral side of said second panel, each of said loops being spaced from an associated one of said tabs, said pair of loops including a first loop and a second loop; and a plurality of links, each of said links being pivotally coupled between an associated pair of said securing units, each of said links having a first end and a second end, said first end having a first slot extending toward said second end, said first slot insertably receiving said first loop on an associated one of said securing units, said second end having a second slot extending toward said first end, said second slot insertably receiving said second loop on an associated one of said securing units;

a plurality of first pins, each of said first pins being selectively extended through an associated one of said links, each of said first pins extending through said first slot in said associated link and extending through said first loop of said associated securing unit such that said associated securing unit is pivotally coupled to said associated link; and a plurality of second pins, each of said second pins being selectively extended through an associated one of said links, each of said second pins extending through said second slot in said associated link and extending through said second loop of said associated securing unit such that said associated securing unit is pivotally coupled to said associated link.

\* \* \* \* \*